Nov. 22, 1960  R. A. DAY, JR., ET AL  2,961,490
TELEPRINTER APPARATUS

Filed May 22, 1958   3 Sheets-Sheet 1

INVENTORS
Richard A. Day, Jr.
Robert E. White
BY
Ralph B. Stewart
ATTORNEY

Nov. 22, 1960  R. A. DAY, JR., ET AL  2,961,490
TELEPRINTER APPARATUS

Filed May 22, 1958  3 Sheets-Sheet 2

INVENTORS
Richard A. Day, Jr.
Robert E. White
BY
Ralph B. Stewart
ATTORNEY

United States Patent Office 2,961,490
Patented Nov. 22, 1960

2,961,490

TELEPRINTER APPARATUS

Richard Allen Day, Jr., Washington, D.C., and Robert E. White, Worcester, Mass., assignors to British Telecommunications Research Limited, Buckinghamshire, England, a British company Filed May 22, 1958, Ser. No. 737,024

Claims priority, application Great Britain May 22, 1957

3 Claims. (Cl. 178—69)

The present invention relates to teleprinter apparatus.

More specifically, the invention relates to apparatus for measuring teleprinter distortion in a system in which single current signals are converted into double current signals, and wherein means is provided for producing a visual indication of the instants of transition from mark to space and from space to mark in the double current signals.

An object of the invention is to provide distortion-measuring apparatus of the kind indicated which will function correctly even though the teleprinter signals may not fall to earth potential for each space signal.

A preferred form of the invention will be described in connection with the accompanying drawing in which.

Figure 1:
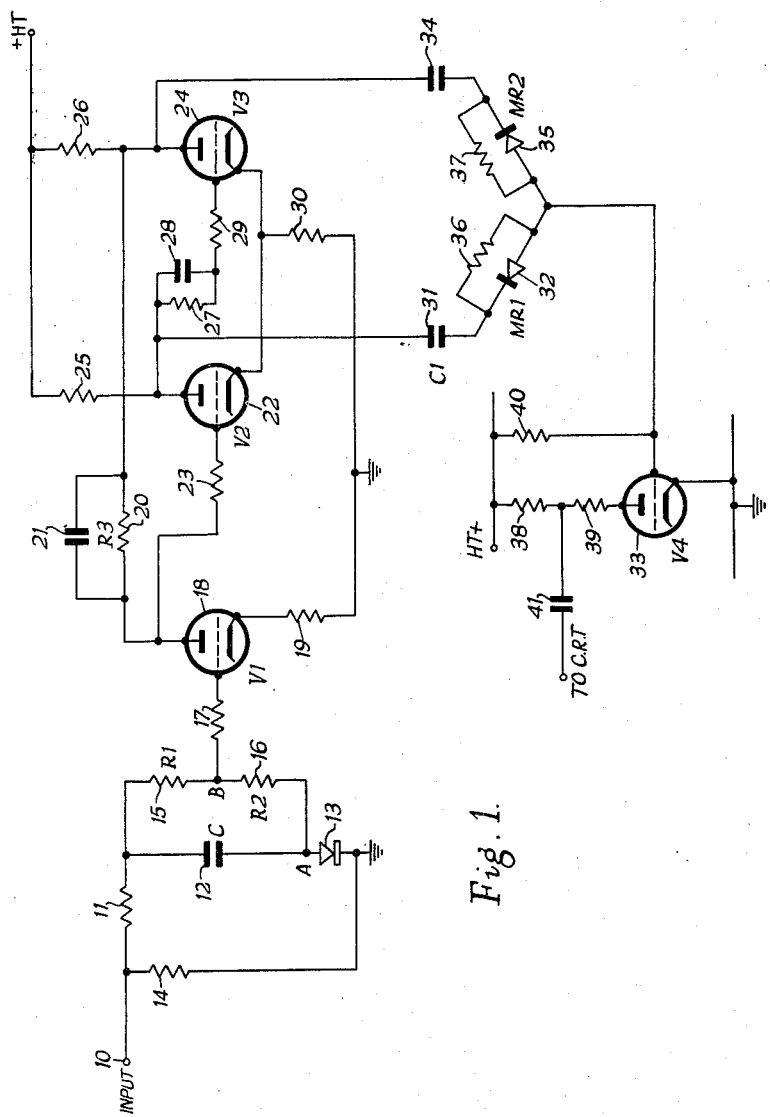
Figure 1 shows a known form of distortion measuring system on which applicants' invention is an improvement.

For use in the measurement of teleprinter distortion, apparatus having the circuit shown in Fig. 1 of the accompanying drawings has already been proposed.

In Fig. 1 positive-going single current (neutral) teleprinter signals are applied to an input terminal 10. Between the terminal 10 and earth a resistor 11, a capacitor 12 and a rectifier 13 are connected in series as shown. A further resistor 14 is connected direct between the terminal 10 and earth and two resistors 15 and 16 of equal resistances are connected in series across the capacitor 12.

The junction of the two resistors 15 and 16 is connected through a further resistor 17 to the control grid of a triode valve 18 whose cathode is connected to earth through a resistor 19. An anode feed resistor 20 shunted by a capacitor 21 is provided for the valve 18 the anode of which is directly-coupled to the control grid of a further triode valve by means of a resistor 23.

The valve 22 and a further triode valve 24 with their associated impedance elements 25 to 30 constitute a trigger-pair circuit. This circuit can be set in either of two stable states by the application of a pulse of suitable polarity to the control grid of the valve 18. In one of these stable states the valve 22 is conducting and the valve 24 is non-conducting, and vice-versa for the other stable state.

The anode of the valve 22 is connected through a capacitor 31 and a rectifier 32 in series to the control grid of another triode valve 33. The anode of the valve 24 is connected through a capacitor 34 and rectifier 35 to the control grid of the valve 33. The rectifiers 32 and 35 are shunted by resistors 36 and 37 respectively. The triode 33 with its associated impedance elements 38 to 41 constitutes an amplifier with an output terminal at 42.

Assuming each positive-going pulse applied to the input terminal 10 to be of an amplitude of +80 volts the capacitor 12 is charged through the rectifier 13, the upper plate (in the drawing) of the capacitor reaching +80 volts the lower plate being earthed through the rectifier 13. When the pulse ceases and the potential of the input terminal falls to zero the upper plate of the capacitor 12 being connected to earth through the resistors 11 and 14 falls to earth potential and the lower plate of the capacitor falls to a potential of —80 volts.

As the resistors 15 and 16 are of equal resistances the potential of the control grid of the valve 18 is firstly +40 volts and then —40 volts. Thus the single current applied signal is converted into a double current (polar) signal on the control grid of the valve 18.

When the control grid of the valve 18 is 40 volts positive the valve 22 is rendered non-conducting and the valve 24 conducting. When the control grid of the valve 18 is 40 volts negative the valve 22 is rendered conducting and the valve 24 non-conducting.

Each of the circuits 31, 32, 36 and 34, 35, 37 constitutes a differentiating circuit adapted to pass only the negative-going voltage "spikes" to the control grid of the valve 33.

As the control grid of the valve 33 is connected to the terminal HT+ through the resistor 40 the valve 33 normally passes substantial anode current. On the application of a negative-going "spike" from the differentiating circuit 31, 32, 36 or 34, 35, 37 the valve 33 is rendered non-conducting and hence produces a positive-going voltage "spike" of substantial amplitude at the output terminal 42.

Associated with the circuit of Fig. 1 there is a cathode ray tube (not shown) and any suitable circuit is provided for generating a spiral time base on the cathode ray tube screen commencing with each teleprinter signal representing a character.

The positive-going voltage "spikes" appearing at the terminal 42 are applied to brighten the trace on the cathode ray tube screen and hence the trace appears as a spiral with bright dots indicating the transitions from "mark" to "space" and "space" to "mark."

Figure 2:
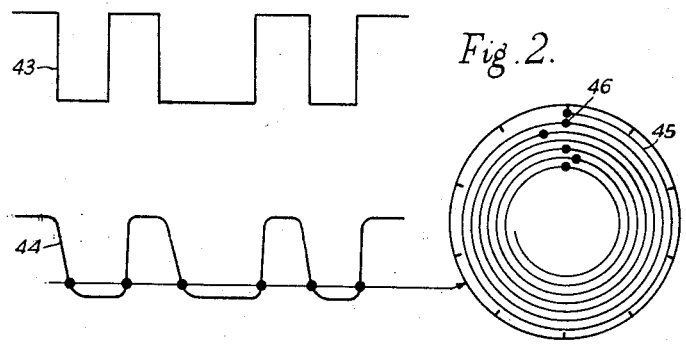
Figure 2 shows an example of a single current signal and a corresponding double current signal, together with a cathode tube display showing the instants of transition of the double current signal.

In Fig. 2 the curve 43 represents a perfect teleprinter signal the curve 44 represents a distorted form of the signal 43 with end distortion and bias distortion. A typical display of the signal 44 is shown by the spiral trace 45 with bright dots 46 indicating the change-over points between mark and space.

So long as the teleprinter signals applied to the input terminal 10 fall to earth potential for each space signal the circuit arrangement of Fig. 1 is entirely satisfactory.

In some teleprinter systems it is not possible to achieve these conditions, however, and the circuit arrangement of Fig. 1 has the disadvantage that it does not produce the result required since the rectifier 13 never becomes non-conducting and hence the valve 18 is never "cut-off."

Figure 3:
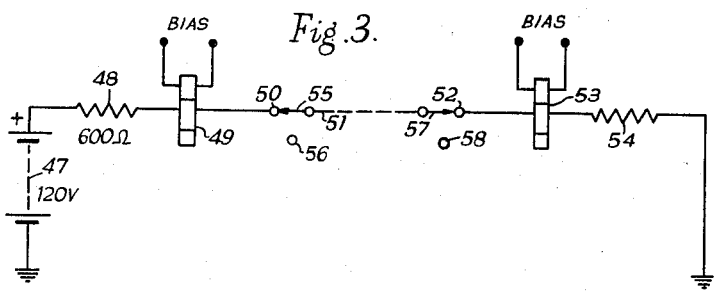
Figure 3 is a circuit diagram showing a central battery system in which the measuring apparatus is employed.

For example Fig. 3 shows the battery and relays of a central battery system. The negative pole of a 120 volts battery 47 is connected through a 600 ohm resistor 48, a 200 ohm winding 49 of a teleprinter relay, and a mark contact 50 to a line 51.

The other end of the line 51 is connected through a mark contact 52, a 200 ohm relay winding 53, and a 120 ohm resistor 54 to earth.

In operation, with a tongue 55 actuated to send signals to the relay 53 the marking potential at the sending end is +72 volts and that at the receiving end +18.2 volts. When the tongue 55 moves to the space contact 56 opening the circuit to send a space signal, the spacing potential at both ends falls to zero.

When a tongue 57 is actuated to send signals to the relay 49 the marking potential is +18.2 volts at the sending end and +72 volts at the receiving end. When, however, the tongue 57 moves to its space contact 58 the spacing potentials at both ends rise to +120 volts.

Thus, in this instance, both mark and space signals are of positive polarity and the circuit of Fig. 1 would not function to give the display of Fig. 2.

It is an object of the present invention to provide improved apparatus for use in measuring distortion in teleprinter signals in which the aforesaid disadvantage can be overcome.

According to the present invention apparatus for use in measuring distortion in teleprinter signals, comprises a circuit for deriving double current signals from single current signals connected to means for deriving a pulse from each transition from mark to space and space to mark in the derived double current signals, and an indicator connected to the last said means for displaying the derived pulses on a time base, characterised in that the circuit for deriving the double current signals comprises an input terminal connected through a resistance element to a source of potential variable from zero over ranges of positive and negative values, and an output terminal connected to a point in the resistance element. The source of variable potential may comprise a potentiometer with the two ends of its resistance track connected to two terminals respectively positive and negative with respect to earth, the wiper of the potentiometer being then of a potential which is zero or positive or negative depending upon the setting of the potentiometer. The said resistance element may be in two parts each in the form of a fixed resistor, the two parts being connected in series and the output terminal being connected to the lead between the two resistors. By adjustment of the variable potential source the signals appearing at the output terminal can be made to vary about any desired datum level.

One embodiment of the invention will be described, by way of example, with reference to Fig. 4, in which the elements 17 to 40 correspond to the elements of like references in Fig. 1.

Figure 4:
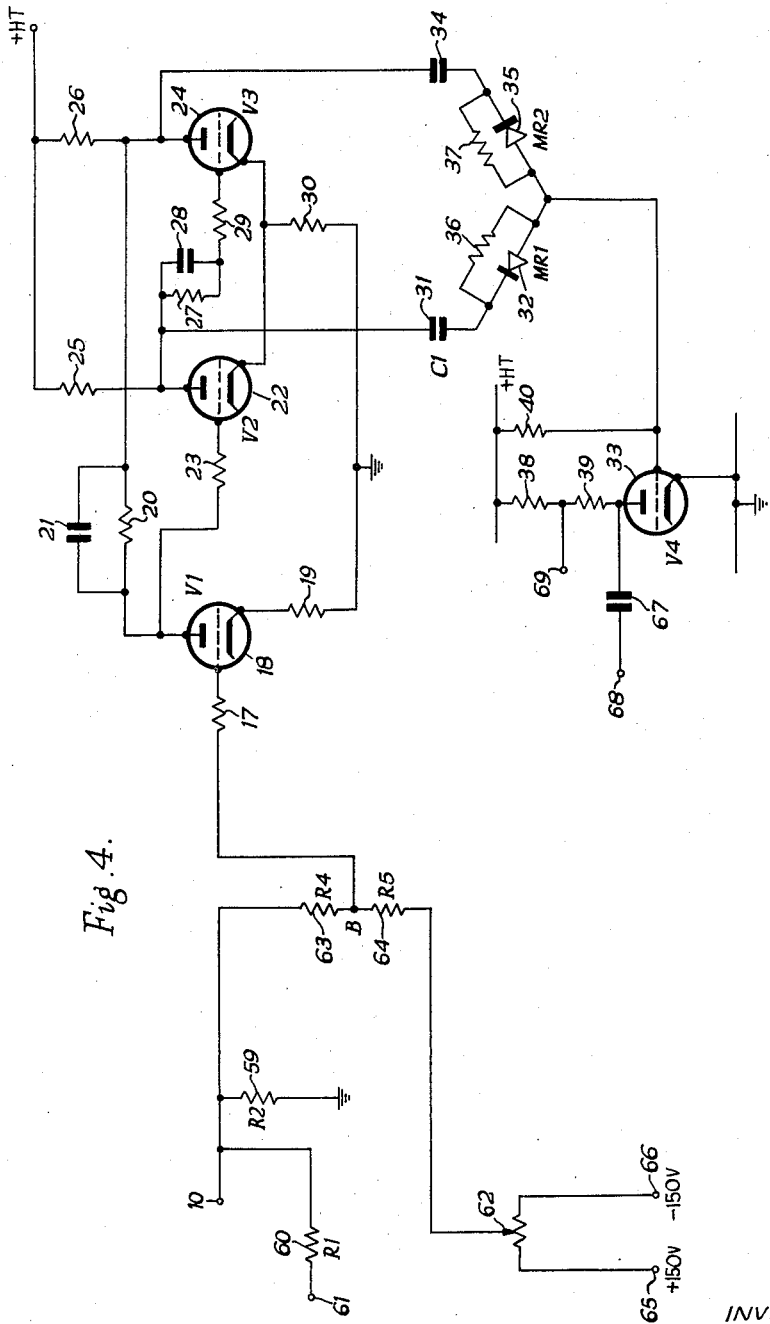
Figure 4 is a circuit diagram representing applicants' improved distortion-measuring system.

In Fig. 4 the input terminal 10 is connected through a resistor 59 to earth and through a resistor 60 to an output terminal 61. Between the input terminal 10 and the wiper of a potentiometer 62 two resistors 63 and 64 are connected in series and the junction of these resistors is connected through the resistor 17 to the control grid of the valve 18.

The outer ends of the resistance element of the potentiometer 62 are connected to two terminals 65 and 66 respectively which are arranged to be at the potentials of +150 volts and −150 volts respectively.

By adjustment of the wiper of the potentiometer 62 single-current teleprinter signals applied to the input terminal 10 can effectively be converted to double current signals at the grid of the valve 18.

For example, if the mark and space voltages at the terminal 10 are +72 volts and +120 volts respectively, by adjusting the wiper of the potentiometer 62 to a setting in which the control grid of the valve is −96 volts in the absence of the signal when the signal is applied the control grid will have the potentials of −24 volts for each mark signal and +24 volts for each space signal. In other words the control grid is effectively earthed and swings to +24 volts and −24 volts for actuating the trigger-pair circuit.

By adjustment of the wiper of the potentiometer 62 the applied single current signals can be caused to operate the trigger circuit at any level between the extremities of +72 and +120 volts of the applied signal.

In Fig. 4 the output terminal 61 is connected to the Y-deflection plates of a cathode ray tube (not shown) which is provided with a linear time base and hence provides a trace showing the waveform of the signals applied to the terminal 10.

The anode of the valve 33 is connected through a capacitor 67 to an output terminal 68 and the voltage "spikes" appearing at the terminal 68 are applied to brighten up the waveform trace. In this way an operator is given an indication of the level in the waveform at which the trigger-pair circuit is being triggered on the transitions from mark to space and vice versa.

A further output terminal 69 is connected to a further cathode ray tube (not shown) provided with a spiral time base as described with reference to Fig. 2 and serves again to provide bright dots on the spiral trace indicating the transitions from mark to space and vice versa.

Figure 5:
Figures 5 and 6 are waveform diagrams representing the operation of Figure 4 under different conditions.
Figure 6:
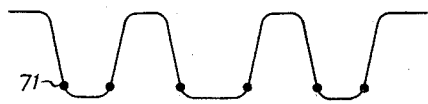

Examples of the waveform display on the linear time base are shown in Figs. 5 and 6 in which the dots 70 in Fig. 5 indicate that the trigger circuit is being operated at about midway between the mark and space potentials. The dots 71 in Fig. 6 indicate that the trigger-pair circuit is being operated at a level close to the space potential.

We claim:

1. Apparatus for use in measuring distortion in teleprinter signals, comprising a circuit for deriving double current signals from single current signals, differentiating circuit means energized by said double current signals and deriving a pulse in response to each transition from mark to space and space to mark in the derived double current signals, and an indicator connected to the last said means for displaying the derived pulses on a time base, characterised in that the circuit for deriving the double current signals comprises an input terminal connected through a resistance element to a source of potential variable from zero over ranges of positive and negative values, and an output terminal connected to a point in the resistance element.

2. Apparatus according to claim 1, wherein the source of variable potential comprises a potentiometer with the two ends of its resistance track connected to two terminals respectively positive and negative with respect to earth.

3. Apparatus according to claim 1, wherein the said resistance element is in two parts connected in series and the output terminal is connected to the lead joining the two parts in series.

References Cited in the file of this patent

UNITED STATES PATENTS

| | | |
|---|---|---|
| 2,597,071 | Cory | May 20, 1952 |
| 2,846,522 | Brown | Aug. 5, 1958 |

OTHER REFERENCES

"Telegraph Transmission Measuring Set," by W. T. Rea, Bell Laboratories Record, December 1943, pages 174–177.

"Cathode Ray Telegraph Distortion Measuring Set," by W. T. Rea, Bell Laboratories Record, April 1947, pages 150–154.